3,438,792
COMBINED FREEZE DRYING-AIR DRY-
ING PROCESS OF DEHYDRATING FOOD
PRODUCTS
Herbert W. Kruger, Portland, Oreg., assignor to Lamb-
Weston, Inc., Portland, Oreg., a corporation of Oregon
No Drawing. Filed Dec. 28, 1965, Ser. No. 517,100
Int. Cl. A23; F26b 5/06
U.S. Cl. 99—199                                          8 Claims

ABSTRACT OF THE DISCLOSURE

A process of dehydrating a food product containing water comprising freezing a piece of the product prior to any air drying thereof, freeze drying the product for a period of between 30 minutes and one hour to remove water by sublimation from the external regions thereof and to provide a porous surface layer through which the moisture in the interior can readily pass, and then air drying the product for between one and three hours to substantially further reduce the moisture content.

---

This invention relates to a process for dehydrating food products and, more particularly, to such a process wherein freeze-drying of the product is combined with air drying, thereby to result in a material reduction in the total time required for dehydration and to obtain a product that will reconstitute faster and be of higher quality than those obtained heretofore.

The products of the process of the present invention can be readily reconstituted in water and, when so reconstituted, are of good quality and are the substantial equivalent of the product before dehydration.

The process of food dehydration by freeze-drying is well known. Essentially it is the process of removing moisture from a frozen product by sublimation. The process, however, is subject to a number of disadvantages, among the most serious of which is the great length of time and consequent high expense required to reduce the moisture content to a relatively low percentage, for example, to under 5%. Another disadvantage is the tendency to scorch the product as the moisture content is reduced to the lower values. This latter disadvantage is inherent in the process. In the usual freeze-drying process a frozen product is placed on a suitable supporting means in a vacuum chamber and is subjected simultaneously to a high degree of vacuum and the addition of heat which causes the water in the product to sublime, the supply of heat being regulated to equal the loss of heat occasioned by the sublimation of the ice in the product. As the evaporation and heating is continued until the lower moisture contents are approached, the rate of cooling occasioned by the sublimation of the ice becomes somewhat slower, and the temperature of the product tends to rise, especially on its surface, often approaching the scorching point. Scorching is a serious flaw in the finally reconstituted product, as will be obvious. Still another disadvantage to the free-drying process is that a food product dried exclusively by this method ordinarily will not fully reconstitute, i.e., it will not absorb sufficient moisture to attain its original weight. As a result, the reconstituted product has an appearance and texture different from the original product and frequently is unacceptable to the consumer. This disadvantage will be more fully discussed hereinafter.

Air drying of a food product as the sole method of moisture removal is also subject to a number of disadvantages. In the early stages of air dehydration, as moisture is removed from the surface of the product it is replaced by the migration of liquid from the interior of the piece. This leaves a layer of soluble solids on and near the external surfaces of the product. As such dehydration continues, this layer of soluble solids builds up and presents an ever increasing resistance to the escape of water from the interior. This phenomenon is frequently referred to as "case-hardening." If further air drying is continued by this process, soluble solids will continue to be deposited in the external regions and will reach a depth such that the migration of water from the interior is inhibited. If further dehydration is to occur, in the final stages of dehydration the water in the interior generally must evaporate and migrate to the surface in the gaseous state. It is thus apparent that the dehydration of the remaining water through a case-hardened surface is extremely slow and requires many hours, ranging from 10 to 24 hours, depending on the nature of the product, to reach a moisture content of 5%. This extended period of time is typical of known air-drying procedures.

Though having certain disadvantages as mentioned above, freeze-drying is of advantage as compared to air drying in that a case-hardened external surface as above described is not formed. Instead, in freeze-drying a porous surface layer is formed which permits the unhampered escape of the remaining moisture from the interior during dehydration and permits the re-entrance of water upon reconstitution.

Both processes, however, when used exclusively to dry a food product, produce a product that is difficult to reconstitute fully. For example, in the case of potatoes, even though the pieces to be dried are made too small for most purposes, the fully dried small pieces will still not reconstitute to 100% of their pre-dehydrated weight. In the case of fully air-dried potatoes, reconstitution is possible only to approximately 70%, that is, the weight of the reconstituted product is only approximately 70% of the weight of the product before it was dried. Such a product has neither the taste nor the appearance of the pre-dehydrated product, and as such fails to achieve any significant degree of customer preference. The reason for this is that the case-hardened surface that results from conventional air-drying techniques inhibits the re-entrance of water. The soluble solids deposited in the external regions apparently undergo certain chemical or other changes which make them much less soluble than they originally were. In any event, the water necessary fully to reconstitute the product is unable to pass through the tight, relatively impervious skin which is thus formed.

A fully freeze-dried product is also difficult to reconstitute fully, as above mentioned, and the end product is often of inferior quality. When a fully freeze-dried product is placed in boiling water, the external layer reconstitutes readily due to the porous nature thereof. However, the interior often fails to reconstitute properly, so that the product is fully reconstituted on the outside, but has a relatively dry, unreconstituted center portion.

Accordingly, it is an object of the present invention to provide a process of dehydrating food and other products that will permit such products to be reconstituted fully and quickly.

It is a further object of the present invention to provide a process for dehydration of foods that will permit such foods to be reconstituted into a good quality product.

It is a still further object of the present invention to provide a process of dehydrating food and other products that will materially reduce the total time required for dehydration.

It is a still further object of the present invention to provide a less expensive process of dehydrating food and other products.

It is a still further object of the present invention to provide a process for the dehydration of food and other products that will avoid the disadvantages experienced with both a fully air-dried product and a fully freeze-dried product.

The present invention achieves these objects by freezing the product and thereafter freeze-drying the product for a short period of time sufficient only to remove water by sublimation from the external regions to provide a porous layer through which the moisture in the interior of the product can readily pass. Following this initial period of freeze-drying, the product is subjected to air drying until the final desired moisture content is reached, the porous surface layer providing space for the deposit of soluble materials carried in the moisture migrating from the interior and at the same time providing channels for the escape of moisture and through which channels water can re-enter the product upon reconstitution thereof. The process of freeze-drying followed by air drying reduces the moisture content to 5% or less in much less time than has been possible heretofore and achieves a product which will reconstitute readily. It should be understood, of course, that unless a dehydrated product is to be hermetically sealed, it is normal to stop the dehydration process at about a 7% moisture content, at which point products will normalize in air. If of course the product is to be hermetically sealed, lower moisture contents can be achieved and may in fact be desirable.

A food product that is to be dehydrated by the process of the present invention is first peeled if necessary and washed. It is then cut to the desired shape and, for example in the case of potatoes, washed again to remove free starch which has been liberated in the cutting step. Inasmuch as many vegetables, and especially potatoes, deteriorate rapidly on areas from which the skin has been removed or on freshly cut surfaces due to enzyme action, it may be necessary at this point to expose the product to an enzyme retardant, such as a solution of sodium bisulfite and citirc acid.

The product is then blanched, if necessary. In the case of potatoes, immersion in boiling water for three minutes has been found satisfactory; immersion in 160° F. water for a period of 15 minutes has also been used successfully; blanching in steam at 212° F. for three minutes can also be used. The nature of the raw product and the texture desired in the finished product will determine which blanching method, if any, should be used, or perhaps which combination of blanching methods should be used. Some products do not require blanching prior to further processing. These include most berries and also pears.

The product is then frozen by either a quick freeze or a slow freeze method. Quick freezing for the purpose of this discussion is defined as that process where the temperature of the food passes through the zone of maximum ice crystal formation (32°–25° F.) in 30 minutes or less. A product can be quick frozen in an air stream of suitable temperature. It can also be dipped in or sprayed with liquid nitrogen, refrigerant or liquid carbon dioxide. Slow freezing for the purpose of this discussion is defined as freezing a product in an air stream above 0° F. The nature of the raw product, such as the sum of the total solids therein, will determine if slow freezing or quick freezing should be used to obtain the desired final texture.

After the freezing step has been accomplished, the product is then subjected to freeze-drying for a period of time sufficient to remove water from the external regions to a depth which will prevent liquid solutions from the interior from depositing a film on the outer surfaces of the product. This depth will vary depending on the nature and size of the product, and in the case of ⅜ inch potato cubes may be about one-tenth inch. The freeze-drying time required may vary from about 30 minutes to about one hour. Any of the usual forms of freeze-drying may be used. For example, the product may be subjected to freeze-drying in a vacuum at a pressure below 4.5 mm. of Hg (4500 microns), the vapor pressure of ice at 0° C., so as to keep the product from thawing while heat is applied to achieve sublimation. Alternatively, the product may be subjected to freeze-drying at atmospheric pressure in the air stream having a partial water vapor pressure below that which exists above ice in equilibrium at the temperature of the air stream, or the product may be subjected to freeze-drying at intermediate pressures in an air stream having a partial pressure of water vapor below the vapor pressure of ice in equilibrium at the temperature of the air stream. The resulting evaporation forms a porous layer on the exterior of the product through which the moisture in the interior can readily pass. The interior of the product beneath this porous exterior layer, however, is not dehydrated.

A satisfactory way of accomplishing the freeze-drying step is to place the pieces of the frozen product on product trays on which they are preferably spaced apart sufficiently to permit the moisture to escape. The heat necessary for sublimation is supplied by means of top and bottom heating plates. This arrangement supplies the necessary heat and also permits the escape of water vapor from the sides of the pieces. Since ice is a relatively good conductor, heat from the lower heating plate is transferred by conduction from the bottoms of the individual pieces to their sides, thereby to sublime the ice from the exterior surfaces thereof. In some instances the product may be tumbled or otherwise agitated during freeze-drying.

Finally the product is air-dried to a desired moisture content, such as by placing it in an air dryer and subjecting it to air of an elevated temperature. The time and temperature will depend on the product and may, for example, be between about 1 and 3 hours. For example, in the case of potatoes the temperature of the air may be between about 140° and 220° F. On the other hand, meat products should not be heated higher than 120° F. During the air-drying step the moisture remaining in the interior migrates toward the freeze-dried surface where the porous external layer formed on the product as a result of the freeze-drying step readily permits it to escape. It is thus possible to achieve a final moisture content of 5% or less in a relatively short period of time.

The soluble solids that were present in the moisture in the center of the product are left in the porous external layer when the water vaporizes, but do not form the impenetrable case-hardened layer above described. It is theorized that this occurs because inter-cellular voids are formed during the freeze-drying step, which voids are large enough to accommodate the precipitating solids from the interior water without forming a tight impervious layer, leaving channels in the porous external layer through which moisture may escape in the final stages of air drying, and through which channels water may re-enter during reconstitution. The inside of the product is subject to shriveling as would occur in the usual air-drying process. As a result of the shriveling, water may readily penetrate the entire product piece upon reconstitution so as to result in a high quality product.

Examination of the interior of product pieces dehydrated by the process of this invention discloses a novel structure. The interior is not uniformly tightly packed and shriveled as in the case of fully air-dried products. Rather, the shriveling appears to be somewhat lattice-like. Voids are formed between the shriveled portions. This lattice-like structure is not deleterious to the texture of the reconstituted product.

The process of this invention is applicable to many types of food products. It may also be used to dehydrate non-food products. Another advantage of the process is that much larger pieces can easily be dehydrated, such that they will readily reconstitute in water. Fragility of the dehydrated product and texture in the finally-reconstituted product can be controlled by variations in the early processing steps, as will be apparent to those skilled in the art.

The invention is further illustrated by the following examples:

Example 1

Potatoes having a specific gravity of 1.0825 and a total solids content of 21.3% were cut into ⅜ inch cubes (diced) and were placed in a solution of approximately 0.5% sodium bisulfite and citric acid for 45 minutes. They were then blanched in water at 162° F. for 15 minutes. Next they were placed in a freezing chamber and subjected to rapid freezing (in circulating air at −20° F.) for one hour and five minutes. The potatoes were then subjected to freeze-drying for 40 minutes in a vacuum chamber. They were placed on two product trays, each of which was placed between two heating plates. The current supplied to the apparatus was 4.9 amperes at 141 volts. Thermocouples were attached to both the heating plates and the product trays to measure the temperatures as the freeze-drying progressed. Thermocouple 1 was on the upper heating plate; thermocouple 2 was on the upper product tray; thermocouple 3 was on the heating plate above the lower product tray; and thermocouple 4 was on the lower product tray. The vacuum pump was turned on at the start of the cycle. The data was as tabulated below:

| Time, min. | Vacuum, microns | Temperature, ° F. at thermocouples | | | |
|---|---|---|---|---|---|
| | | 1 | 2 | 3 | 4 |
| 0 | | 116 | 42 | 116 | 34 |
| 10 | 330 | 151 | 59 | 145 | 48 |
| 20 | 350 | 196 | 101 | 190 | 81 |
| 30 | 400 | 220 | 131 | 214 | 105 |
| 40 | 400 | 241 | 162 | 237 | 132 |

The loss of water as a result of the rapid freezing and the freeze-drying amounted to 36.5%, based on the weight of potatoes that was initially subjected to rapid freezing. The potatoes were then removed from the vacuum chamber and air-dried for 120 minutes, the air temperature varying from 172 to 180° F. The final moisture content was found to be 1.7%. The bulk density was found to be 13.0 lbs./cu. ft. The thus dried pieces of potato were then reconstituted by placing them in boiling water for 1½ minutes and then allowing them to stand in the hot water for an additional 1 minute. All were found to be firm and to have good color, flavor and odor.

Example 2

Another batch of the same potatoes was diced, sulfited and blanched as in Example 1. This batch, however, was subjected to slow freezing by being placed in a freezer chest for 24 hours at 0° F. The weight loss during the slow freezing was found to be 2.2%, based on the weight of product going into the freezer. The product was then subjected to freeze-drying, again for 40 minutes in a vacuum chamber as in Example 1. The current and voltage applied was the same, and temperatures and vacuum were recorded similarly. The values were:

| Time, min. | Vacuum, microns | Temperature, ° F. at thermocouples | | | |
|---|---|---|---|---|---|
| | | 1 | 2 | 3 | 4 |
| 0 | | 31 | 5 | 30 | 4 |
| 10 | 375 | 31 | 5 | 30 | 4 |
| 15 | 375 | 58 | 13 | 57 | 11.5 |
| 20 | 350 | 90 | 27 | 89 | 25 |
| 22 | 400 | 120 | 45 | 122 | 41 |
| 25 | 400 | 137 | 57 | 138 | 52 |
| 28 | 400 | 149 | 65 | 149 | 60 |
| 31 | 400 | 167 | 80 | 165 | 69 |
| 37 | 400 | 195 | 97 | 196 | 87 |
| 40 | 400 | 198 | 113 | 198 | 99 |

During the freeze-drying there was a weight loss of 14.9% based on the weight of product going into the vacuum chamber. The product was then subjected to air-drying for a period of 120 minutes in air at 175° F. The final moisture content was found to be 2.5%. The bulk density of the finished product was 14.5 lbs./cu. ft.

The product was reconstituted by placing it in boiling water for 1½ minutes and then was allowed to cool in the hot water until a total time of 8½ minutes had elapsed. The product as reconstituted was found to be firm to hard, and to have good color, flavor and odor.

Example 3

Another batch of the same potatoes was diced and sulfited as in Examples 1 and 2, but was blanched in water at 160° F. for 12 minutes. It was then subjected to rapid frreezing for 1 hour at a temperature between −20° and −30° F. During the rapid freezing the product achieved a weight loss of 3.86% based on the initial weight of the product. The product was then subjected to freeze-drying for 45 minutes in a vacuum chamber. In this example, however, three product trays were placed in the vacuum chamber, with heating plates above and below each. Thermocouples were placed on the topmost heating plate (No. 1); on the upper product tray (No. 2); on the lowest product tray (No. 4); and on the heating plate above the lowest product tray (No. 3). The vacuum and temperatures were as recorded below.

| Time, min. | Vacuum, microns | Temperature, ° F. at thermocouples | | | |
|---|---|---|---|---|---|
| | | 1 | 2 | 3 | 4 |
| 5 | 600 | 48 | 11 | 43 | 16 |
| 10 | 300 | 39 | 6 | 36 | 11 |
| 20 | 300 | 117 | 34 | 103 | 43 |
| 25 | 300 | 126 | 38 | 110 | 46 |
| 30 | 300 | 146 | 50 | 128 | 61 |
| 35 | 300 | 168 | 64 | 147 | 78 |
| 40 | 300 | 187 | 78 | 165 | 94 |
| 45 | 325 | 203 | 91 | 181 | 111 |

The product had a weight loss of 25.0% at the end of the freeze-drying step, based on the weight of the product going into the freeze drier. The product was then subjected to air-drying for a period of 2 hours in air that varied between 170 and 175° F. The final moisture content was found to be 2%. The bulk density of the finished product was 16.29 lbs./cu. ft. Upon reconstitution the product was also found to be firm and to have good color, flavor and odor.

Example 4

Sweet potatoes were cut into ⅜ inch cubes (diced) and were placed in a solution of sodium bisulfite and citric acid for 15 minutes. They were then blanched in 212° F. water for 3 minutes, drained and cooled. They weighed 328.6 grams. Next they were quick frozen by placing them in a −30° F. air stream for 30 minutes. The sweet potatoes were then subjected to freeze-drying for 50 minutes in a vacuum chamber. They were placed on three product trays, which were interleaved between four infra-red heating plates, numbered 1 to 4, from top to bottom. Thermocouples were attached to the heating plates on the sides facing the top and bottom product trays, that is, thermocouple 1 was on the underside of the topmost (1) heating plate facing the top product tray; thermocouple 2 was on the top side of the next lowest (2) heating plate; thermocouple 3 was on the underside of the next-to-lowest (3) heating plate; and thermocouple 4 was on the top side of the lowest (4) heating plate. The following data was recorded, the last column in the table being the temperature at which the refrigerant was evaporating inside the condensing coil:

| Time, min. | Infra red plate temperatures, ° F. | | | | Amperes to plate | | | | Volts supplied | Vacuum, microns | Evap., ° F. |
|---|---|---|---|---|---|---|---|---|---|---|---|
| | 1 | 2 | 3 | 4 | 1 | 2 | 3 | 4 | | | |
| 10 | 290 | 308 | 320 | 284 | 4.0 | 4.4 | 4.4 | 4.1 | 125 | 250 | −12 |
| 20 | 293 | 284 | 304 | 300 | | | | | 85 | 250 | −14 |
| 30 | 316 | 300 | 315 | 323 | 2.6 | 2.6 | 2.6 | 2.4 | 75 | 225 | −17 |
| 40 | 326 | 308 | 317 | 313 | 2.4 | 2.6 | 2.6 | 2.0 | 75 | 220 | −17 |
| 50 | 314 | 309 | 312 | 304 | 2.2 | 2.4 | 2.4 | 2.0 | 70 | 200 | −17 |

There was a 60.6% weight loss during both the freezing and freeze-drying steps. After the sweet potatoes were removed from the vacuum chamber, they were air dried for 90 minutes in 170° F. air. The final moisture content was found to be 1.8%.

The thus dried pieces of sweet potato were then reconstituted by placing them in a container of boiling water and allowing them to say in the boiling water for 3 minutes, then removing the container from the source of heat and allowing the product pieces to remain in the water for an additional 3 minutes. The pieces as thus reconstituted were found to have good texture and flavor and to be in all respects an excellent product.

Example 5

Apples were cut into 3/8 inch cubes (diced) and were placed in a solution of sodium bisulfite and citric acid for 15 minutes. They were then blanched in 212° F. water for 2 minutes, drained and cooled. They weighed 330.9 grams. Next they were quick frozen by placing them in an −30° F. air stream for 30 minutes. The apples were then subjected to freeze-drying in a vacuum chamber. They were placed on three product trays, which were interleaved between four infra-red heating plates, as in Example 4. The location of the thermocouples was the same as in Example 4. The following data was recorded:

| Time, min. | Infra red plate temperatures, ° F. | | | | Amperes to plate | | | | Volts supplied | Vacuum, microns | Evap., ° F. |
|---|---|---|---|---|---|---|---|---|---|---|---|
| | 1 | 2 | 3 | 4 | 1 | 2 | 3 | 4 | | | |
| 10 | 290 | 308 | 320 | 284 | 4.0 | 4.4 | 4.4 | 4.1 | 125 | 250 | −12 |
| 20 | 293 | 284 | 304 | 300 | | | | | 85 | 250 | −14 |
| 30 | 316 | 300 | 315 | 323 | 2.6 | 2.6 | 2.6 | 2.4 | 75 | 225 | −17 |
| 40 | 326 | 308 | 317 | 313 | 2.4 | 2.6 | 2.6 | 2.0 | 75 | 220 | −17 |
| 50 | 314 | 309 | 312 | 304 | 2.2 | 2.4 | 2.4 | 2.0 | 70 | 200 | −17 |

After 50 minutes in the vacuum chamber, the power was turned off. The freeze drying was continued on the heat stored in the plates until 110 minutes had elapsed, the plates cooling down slowly during this time. The apples experienced a 65.5% weight loss during both the freezing and the freeze-drying steps. The apples were then air dried for 30 minutes in 170° F. air. The final moisture content was found to be 3.4%.

The thus dried pieces of apple were then reconstituted by following the same procedure as in Example 4, and were found to have good texture and flavor.

It cannot be overemphasized that to obtain the objectives of this invention all three of the recited steps must be conducted, and in the precise sequence described. These are particularly referred to in the foregoing examples. In any event, such phases involve firstly, preliminary freezing, secondly, freeze-drying within controlled limits, and finally, air drying. Freeze-drying alone, even if preceded by preliminary freezing, will not achieve the desired functions of the invention. Nor will merely air dehydration by itself attain these objectives. As emphasized above, the freeze-drying involves removal of surface or near surface moisture to obtain a porous outer layer in preparation for the subsequent air dehydration step; only by this preparatory phase does air dehydration become effective. By "effective" is meant the attainment of these fundamental desiderata: firstly, drastic reduction in the overall length of time involved in this process. Such time limit naturally represents a variable dependent upon the type of product being treated; but in the instant case, and with respect to certain types of products, that time limit, including all three phases of treatment, can be limited to as low as three hours. Secondly, this precise sequence of steps permits the air dehydration phase to be substantially reduced—to a matter of between about one and three hours.

These time limitations are in sharp contrast to known methods as will be clear from consideration of the fact that freeze-drying alone, under any conventional practice, may take from twelve to twenty hours; similarly, air dehydration to the extent desired may require from twenty to twenty-four hours if that be utilized as the sole method of moisture reduction.

Finally, the method of this invention is conducive to the obtaining of a dehydrated product having a very small amount of residual moisture content—as to certain products less than two percent, as demonstrated by the examples above given. Yet, despite this drastic reduction in ultimate moisture retention, the process of this invention permits of reconstitution to an extent heretofore unobtainable.

By "reconstitution," in the sense of this invention, is meant reformation of the product to its original taste, texture and appearance upon immersion in water at elevated temperature. In the instant case such reconstitution is achieved to an extent far in excess of that heretofore obtainable under conventional and known dehydration techniques.

In the foregoing description, the invention has been described with reference to certain particular preferred embodiments and examples, although it is to be understood that these are merely illustrative and that the invention may be carried out in other ways without departing from the true spirit and scope of the following appended claims.

I claim:
1. The method of dehydrating a food product containing water, comprising:
 freezing a piece of the product prior to any air dehydration thereof;
 freeze-drying said piece only for a period of time sufficient to remove water by sublimation from the external regions thereof to provide a porous surface layer, said freeze-drying being conducted for that period of time sufficient to remove from about 15% to 65% by weight of the total moisture content of said piece to create said regions through which the moisture in the interior can readily pass; and then
 air-drying said piece to a desired moisture content.
2. The method of claim 1, in which said piece is freeze-dried for a period of time to remove water by sublimation from the external regions thereof sufficient to eliminate case-hardening during said air-drying.

3. The method of claim 1, in which said freez-drying is achieved by subjecting said frozen product to a vacuum sufficient to sublime the ice therein without permitting it to pass through an intermediate liquid phase, while heat is applied to secure sublimation.

4. The method of claim 1, in which said freeze-drying is achieved by maintaining said frozen product at atmospheric pressure in an air-stream having a partial water vapor perssure below the vapor pressure of ice at the temperature of said air-stream.

5. The method of claim 1, in which said freeze-drying is achieved by maintaining said frozen product at intermediate pressures in an air stream having a partial water vapor pressure below the vapor pressure of ice at the temperature of said air stream.

6. The method of claim 1, in which during said freeze-drying, said piece is spaced apart from other pieces of the product.

7. The method of claim 1, in which said piece is tumbled during said freeze-drying.

8. The method of dehydrating a food product containing water comprising:

freezing said product without prior air dehydration thereof;

freeze-drying the product for a period of between about 30 minutes and about one hour; and then air-drying the product for a period of between about 1 and 3 hours, thereby to reduce the moisture content to 7% or less.

References Cited

UNITED STATES PATENTS

| | | | |
|---|---|---|---|
| 2,292,447 | 8/1942 | Irwin | 99—199 |
| 2,400,748 | 5/1946 | Flosdorf | 99—199 |
| 2,930,139 | 3/1960 | Brynko et al. | 34—5 |
| 3,218,725 | 11/1965 | Lamb | 99—199 X |
| 3,219,461 | 11/1965 | Lamb | 99—192 |
| 3,219,462 | 11/1965 | Lamb | 99—204 |
| 3,219,463 | 11/1965 | Lamb | 99—204 |
| 2,899,319 | 8/1959 | Powers et al. | 99—204 |
| 3,096,163 | 7/1963 | Meryman | 99—199 X |
| 3,188,750 | 6/1965 | Davis et al. | 99—199 X |

LIONEL M. SHAPIRO, *Primary Examiner.*

D. M. NAFF, *Assistant Examiner.*

U.S. Cl. X.R.

34—5; 99—200, 204, 207, 208